United States Patent
Xiao et al.

(10) Patent No.: US 12,225,196 B2
(45) Date of Patent: Feb. 11, 2025

(54) IMAGE COMPRESSION METHOD AND APPARATUS THEREOF

(71) Applicant: WUHAN TCL CORPORATE RESEARCH CO., LTD., Wuhan (CN)

(72) Inventors: Yunlei Xiao, Wuhan (CN); Yangxing Liu, Wuhan (CN)

(73) Assignee: WUHAN TCL CORPORATE RESEARCH CO., LTD., Wuhan (CN)

( * ) Notice: Subject to any disclaimer, the term of this patent is extended or adjusted under 35 U.S.C. 154(b) by 366 days.

(21) Appl. No.: 17/853,178

(22) Filed: Jun. 29, 2022

(65) Prior Publication Data

US 2022/0329807 A1  Oct. 13, 2022

Related U.S. Application Data

(63) Continuation of application No. PCT/CN2020/130576, filed on Nov. 20, 2020.

(30) Foreign Application Priority Data

Dec. 31, 2019  (CN) .......................... 201911406329.7

(51) Int. Cl.
*H04N 19/00* (2014.01)
*H04N 19/124* (2014.01)
(Continued)

(52) U.S. Cl.
CPC .......... *H04N 19/124* (2014.11); *H04N 19/13* (2014.11); *H04N 19/149* (2014.11)

(58) Field of Classification Search
CPC ..................................................... H04N 19/00
See application file for complete search history.

(56) References Cited

U.S. PATENT DOCUMENTS

| 2011/0235715 A1 | 9/2011 | Chien et al. |
| 2018/0046915 A1 | 2/2018 | Sun et al. |

(Continued)

FOREIGN PATENT DOCUMENTS

| CN | 101653007 A | 2/2010 | |
| CN | 106658005 A * | 5/2015 | .......... H04N 19/124 |

(Continued)

OTHER PUBLICATIONS

World Intellectual Property Organization (WIPO) International Search Report for PCT/CN2020/130576 Feb. 22, 2021 6 Pages (Including Translation).

(Continued)

*Primary Examiner* — Maryam A Nasri
(74) *Attorney, Agent, or Firm* — ANOVA LAW GROUP, PLLC

(57) ABSTRACT

An image compression method includes: obtaining a target image and a target code rate corresponding to the target image; determining a first code rate parameter corresponding to the target code rate; and inputting the target image and the first code rate parameter into an image compression model, that has been trained, for processing to obtain a compressed image with the target code rate, wherein the image compression model is obtained by training an initial image compression model based on multiple code rate parameters including the first code rate parameter.

18 Claims, 6 Drawing Sheets

(51) Int. Cl.
*H04N 19/13* (2014.01)
*H04N 19/149* (2014.01)

(56) References Cited

U.S. PATENT DOCUMENTS

2018/0176576 A1   6/2018   Rippel et al.
2019/0132591 A1   5/2019   Zhang et al.

FOREIGN PATENT DOCUMENTS

CN    107018422 A    8/2017
CN    109996071 A    7/2019
CN    110198444 A    9/2019
CN    110493596 A    11/2019

OTHER PUBLICATIONS

The European Patent Office (EPO) The Extended European Search Report for Application No. 20910964.4 Feb. 9, 2023 11 Pages.
Yoojin Choi et al., "Variable rate deep image compression with a conditional autoencoder." Proceedings of the IEEE/CVF International Conference on Computer Vision. 2019.

* cited by examiner

IMAGE COMPRESSION METHOD AND APPARATUS THEREOF

CROSS-REFERENCE TO RELATED APPLICATION

This application claims priority to Chinese Patent Application No. 201911406329.7, filed on Dec. 31, 2019, the entire content of which is incorporated herein by reference.

TECHNICAL FIELD

The present disclosure relates to the technical field of image processing and, more particularly, to an image compression method and apparatus thereof.

BACKGROUND

Image compression technology is an important technical means to achieve efficient image transmission and storage. It is a technology that uses less bits to represent an image in an original pixel matrix with or without loss. With the development of deep learning technology, the use of neural network models to achieve image compression has become a popular trend.

However, the existing neural network models are all based on fixed bit rate training, so that one neural network model can only achieve image compression with one bit rate. When it is necessary to obtain compressed images with multiple code rates, different neural network models need to be trained based on different code rates, which reduces an efficiency of image compression, and is time-consuming and labor-intensive.

SUMMARY

One aspect of the present disclosure provides an image compression method. The method includes: obtaining a target image and a target code rate corresponding to the target image; determining a first code rate parameter corresponding to the target code rate; and inputting the target image and the first code rate parameter into an image compression model, that has been trained, for processing to obtain a compressed image with the target code rate, wherein the image compression model is obtained by training an initial image compression model based on multiple code rate parameters including the first code rate parameter.

Another aspect of the present disclosure provides an image compression device. The device includes a memory, a processor, and a computer program stored in the memory and executed by the processor to: obtain a target image and a target code rate corresponding to the target image; determine a first code rate parameter corresponding to the target code rate; and input the target image and the first code rate parameter into an image compression model that has been trained for processing to obtain a compressed image with the target code rate, where the image compression model is obtained by training an initial image compression model based on multiple code rate parameters including the first code rate parameter.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

DETAILED DESCRIPTION OF THE EMBODIMENTS

In the following description, for the purpose of illustration rather than limitation, specific details such as a specific system structure and technology are proposed for a thorough understanding of the embodiments of the present disclosure. However, it should be understood to those skilled in the art that the present disclosure can also be implemented in other embodiments without these specific details. Under certain circumstances, detailed descriptions of well-known systems, devices, circuits, and methods are omitted to avoid unnecessary details from obscuring the description of the present disclosure.

It should be understood that the term "and/or" used in the specification and the appended claims refers to any combination of one or more of the associated listed items and all possible combinations, and includes these combinations. In addition, in the description of the specification and the appended claims, the terms "first", "second", "third", etc. are only used to distinguish and describe differences, and cannot be understood as indicating or implying relative importance.

It should also be understood that references to "one embodiment" or "some embodiments" etc. in the specification means that one or more embodiments of the present disclosure include a specific feature, structure, or characteristic described in combination with the embodiment. Therefore, the sentences starting with "in one embodiment", "in some embodiments", "in another embodiment", "in some other embodiments", etc. appearing in different places in the specification are not necessarily referring to a same embodiment, but are referring to "one or more but not all embodiments" unless it is specifically emphasized otherwise. The terms "including", "including", "having" and their variations all refer to "including but not limited to", unless otherwise specifically emphasized.

The executor of the image compression method provided by the present disclosure is an image processing device. The image processing device may be a terminal device (including but not limited to mobile terminals such as smart phones, tablet computers, wearable devices, cameras, and robots, etc. in various application scenarios), or a server. That is, the image compression method provided by the present disclosure can be executed by a terminal device or a server.

Figure 8:
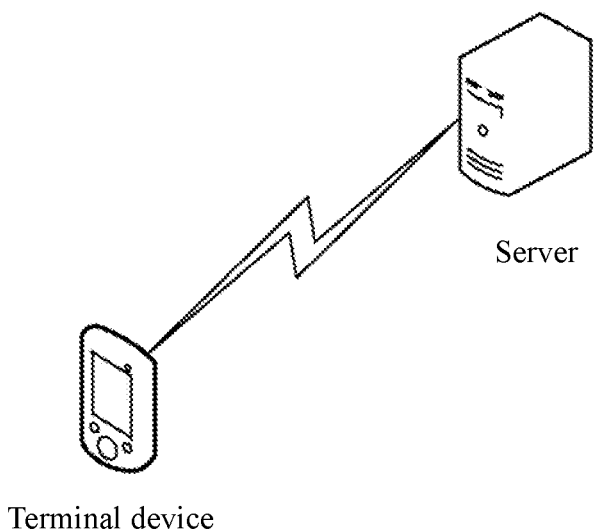
FIG. 8 is a schematic system architecture diagram of an exemplary image compression system according to some embodiments of the present disclosure.

In some embodiments, as shown in FIG. 8, an image processing system provided by the present disclosure includes at least one terminal device and a server. After obtaining a target image, the at least one terminal device sends the target image to the server. The server compresses the target image by executing the image compression method provided by the present disclosure to obtain a compressed image of the target image. The server then sends the compressed image back to the terminal device.

In some other embodiments, after obtaining the target image, the terminal device may compress the target image by executing the image compression method provided by the present disclosure to obtain the compressed image of the target image.

The image compression method provided by the present disclosure will be described in details below with various embodiments.

Figure 1:
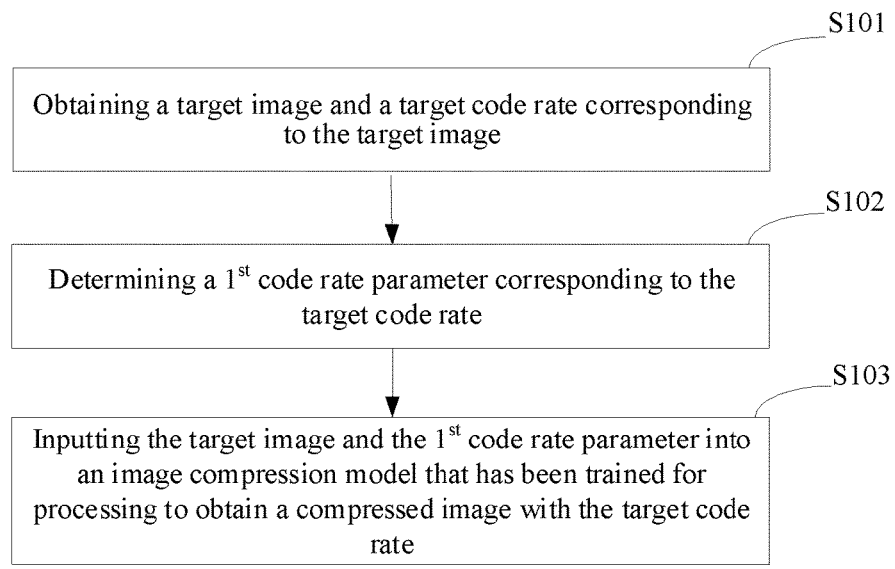
FIG. 1 is a flowchart of an exemplary image compression method according to some embodiments of the present disclosure.

FIG. 1 is a flowchart of an exemplary image compression method according to some embodiments of the present disclosure. As shown in FIG. 1, the image compression method may include the following exemplary processes.

At S101: a target image and a target code rate corresponding to the target image are obtained.

The target image is the image to be compressed. The target image and the target code rate can be inputted by a user. In some embodiments, the target image may be inputted by the user or selected from images stored in the image processing device. The target code rate may be inputted by the user. Alternatively, the image processing device may display a list of available code rates, and may then determine the target code rate selected by the user from the list.

As used herein, a code rate refers to a code length required for coding a pixel unit when compressing an image.

At S102, a first code rate parameter corresponding to the target code rate is determined.

In some embodiments, the image processing device adjusts a code rate through a code rate parameter including a compression weight and/or a quantization parameter. The compression weight may be a Lagrangian coefficient, which is used to perform a non-linear coding process on the target image before a compression process. The compression weight can be a parameter for measuring a compression ratio and an image quality. The larger the compression weight, the smaller the compression ratio, and the better the image quality. The compression ratio refers to a ratio of the image size after the compression process over the image size before the compression process. Different compression ratios correspond to different code rates.

The quantization parameter is used to perform a quantization process on the target image after the non-linear coding process to reduce an amount of data of the compressed image and to facilitate subsequent compression processes. Different quantization parameters correspond to different code rates.

After the target code rate is determined, the image processing device determines the first code rate parameter corresponding to the target code rate. In some embodiments, the image processing device may directly receive the first code rate parameter inputted by the user, or may display a code rate parameter list and then determine the first code rate parameter selected by the user. In some other embodiments, the first code rate parameter corresponding to the target code rate may also be determined based on the target code rate inputted or selected by the user, and a preset relationship between code rate parameters and code rates.

The first code rate parameter may include a first compression weight and/or a first quantization parameter.

At S103: the target image and the first code rate parameter are inputted into a trained image compression model for processing to obtain a compressed image with the target code rate.

In some embodiments, the image compression model is trained based on multiple code rate parameters including the first code rate parameter. The pre-trained image compression model is pre-stored in the image processing device. Machine learning algorithms are used to train a video evaluation model, that is, the image compression model, which is obtained by training an initial image compression model based on multiple image samples and multiple code rate parameters in a sample training set. The initial image compression model is a deep learning network model provided by the present disclosure for image compression based on the multiple code rate parameters.

It should be understood that the image compression model can be pre-trained by the image processing device, or a file corresponding to the image compression model can be transferred to the image processing device after being pre-trained by other devices. In other words, an executor for training the image compression model and an executor for performing the image compression using the image compression model may be the same or different. For example, another device is used to train the initial image compression model. After the another device finishes training the initial image compression model, model parameters of the initial image compression model are fixed to obtain the file corresponding to the image compression model. Then the file is transferred to the image processing device.

With references to two exemplary image compression models, the process of using the image compression model to compress the target image into the compressed image with the target code rate based on the first code rate parameter will be described below.

Figure 2:
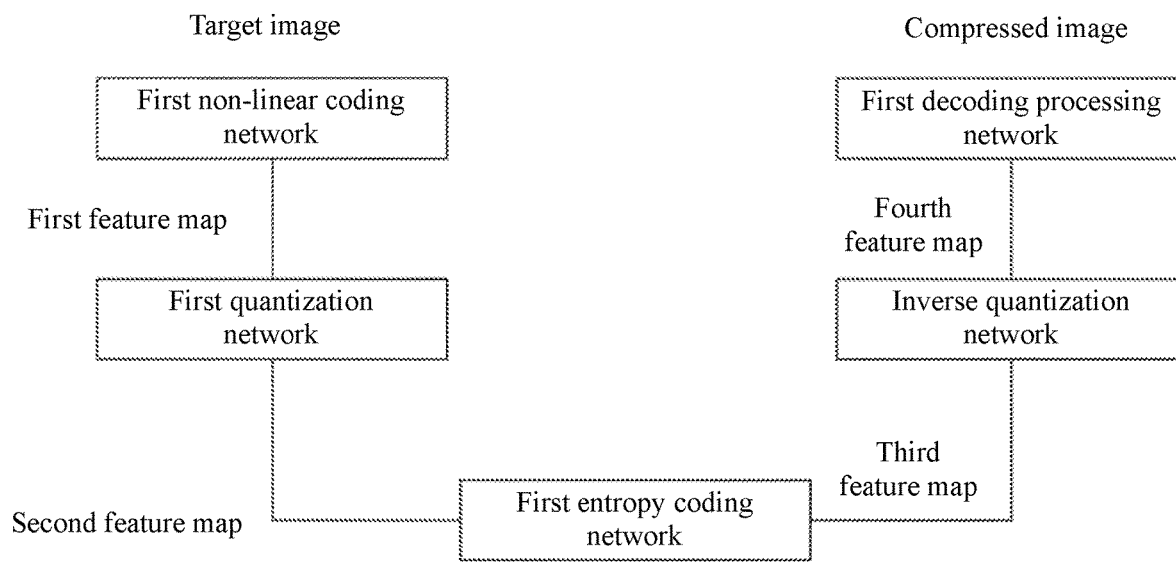
FIG. 2 is a schematic network architecture of an exemplary image compression model according to some embodiments of the present disclosure.

FIG. 2 is a schematic network architecture of an exemplary image compression model according to some embodiments of the present disclosure. As shown in FIG. 2, the image compression model provided by the present disclosure includes a first non-linear coding network and a compression network. The image processing device inputs the target image and the first code rate parameter into the image compression model that has been trained for processing to obtain the compressed image with the target code rate, which includes the following processes.

The image processing device inputs the target image into the first non-linear coding network to perform the non-linear coding process to obtain a first feature map. The first feature map is then inputted to the compression network to perform the compression process to obtain the compressed image.

The compression network includes a first quantization network and a sub-compression network. The image processing device then inputs the first feature map to the compression network to perform the compression process to obtain the compressed image, which includes the following processes.

The image processing device inputs the first feature map to the first quantization network to perform the quantization process to obtain a second feature map that is quantized, and inputs the second feature map to the sub-compression network to perform the compression process to obtain the compressed image.

In some embodiments, the sub-compression network includes a first entropy coding network, an inverse quantization network, and a first decoding processing network. The image processing device inputs the second feature map into the sub-compression network to perform the compression process to obtain the compressed image, which includes the following processes.

The image processing device inputs the second feature map to the first entropy coding network to perform the compression process to obtain a third feature map, inputs the third feature map to the inverse quantization network to perform an inverse quantization process to obtain a fourth feature map that is inversely quantized, and inputs the fourth feature map to the first decoding processing network to perform a decoding process to obtain the compressed image.

The compression process of the second feature map by the first entropy coding network includes: performing a lossless compression process on the second feature map to obtain a binary file of the second feature map, and converting the binary file into the third feature map.

The first decoding network includes a non-linear decoding layer or a post-processing layer including a non-linear decoding layer. If the first decoding network includes the non-linear decoding layer, the compressed image can be obtained after the first decoding network performs a non-linear decoding process on the fourth feature map. If the first decoding network includes a post-processing layer, the first decoding network performs the non-linear decoding process on the fourth feature map, and then performs a post-processing operation (for example, an activation function operation) to obtain the compressed image.

Regarding the above-described image compression model shown in FIG. 2, the image processing device uses the first compression weight and/or the first quantization parameter to achieve control of the target code rate in at least three methods as follows.

Method 1: combining the first compression weight in the first non-linear coding network to achieve the control of the target code rate.

In some embodiments, the image processing device inputs the target image into the first non-linear coding network to perform the non-linear coding process to obtain the first feature map, which includes the following processes.

The image processing device inputs the target image and the first compression weight into the first non-linear coding network. The first non-linear coding network performs a dummy-encoding process on a first compression weight example to obtain a code value corresponding to the first compression weight example, and uses the code value to perform a convolution process on the target image to obtain the first feature map of the target image.

In the embodiments of the present disclosure, the dummy-encoding process is used to encode the first compression weight to obtain the corresponding code value. Since the first compression weight often includes discrete values, after the dummy-encoding process, the discrete values can be coded into continuous values that can be used by the image compression model. For example, a range of the first compression weight is [2, 3, 5, 7]. After the dummy-encoding process, the code value corresponding to the first compression weight 2 is 000, the code value corresponding to the first compression weight 3 is 001, the code value corresponding to the first compression weight 5 is 010, and the code value corresponding to the first compression weight 7 is 011.

After the code value corresponding to the first compression weight example is obtained, the code value can be used to perform the convolution process on the target image.

In some embodiments, the first non-linear coding network includes K convolutional layers, and K is an integer greater than or equal to 1. Input information of each of the K convolutional layers includes an input feature image and the first compression weight. An output feature image of a preceding convolutional layer is the input feature image of a succeeding convolutional layer. The input feature image of the first convolutional layer is the target image, and the output feature image of the K-th convolutional layer is the first feature map.

For example, the processing of the input information by each of the K convolutional layers includes: performing the dummy-encoding process on the first compression weight example to obtain the code value corresponding to the first compression weight example, performing a fully-connected operation and an exponential (Exp) operation on the code value to obtain a first condition value and a second condition value, performing the convolution process on the input feature image to obtain feature information of the input feature image, and obtaining the output feature image of the convolutional layer according to the feature information, the first condition value, and the second condition value.

Figure 3:
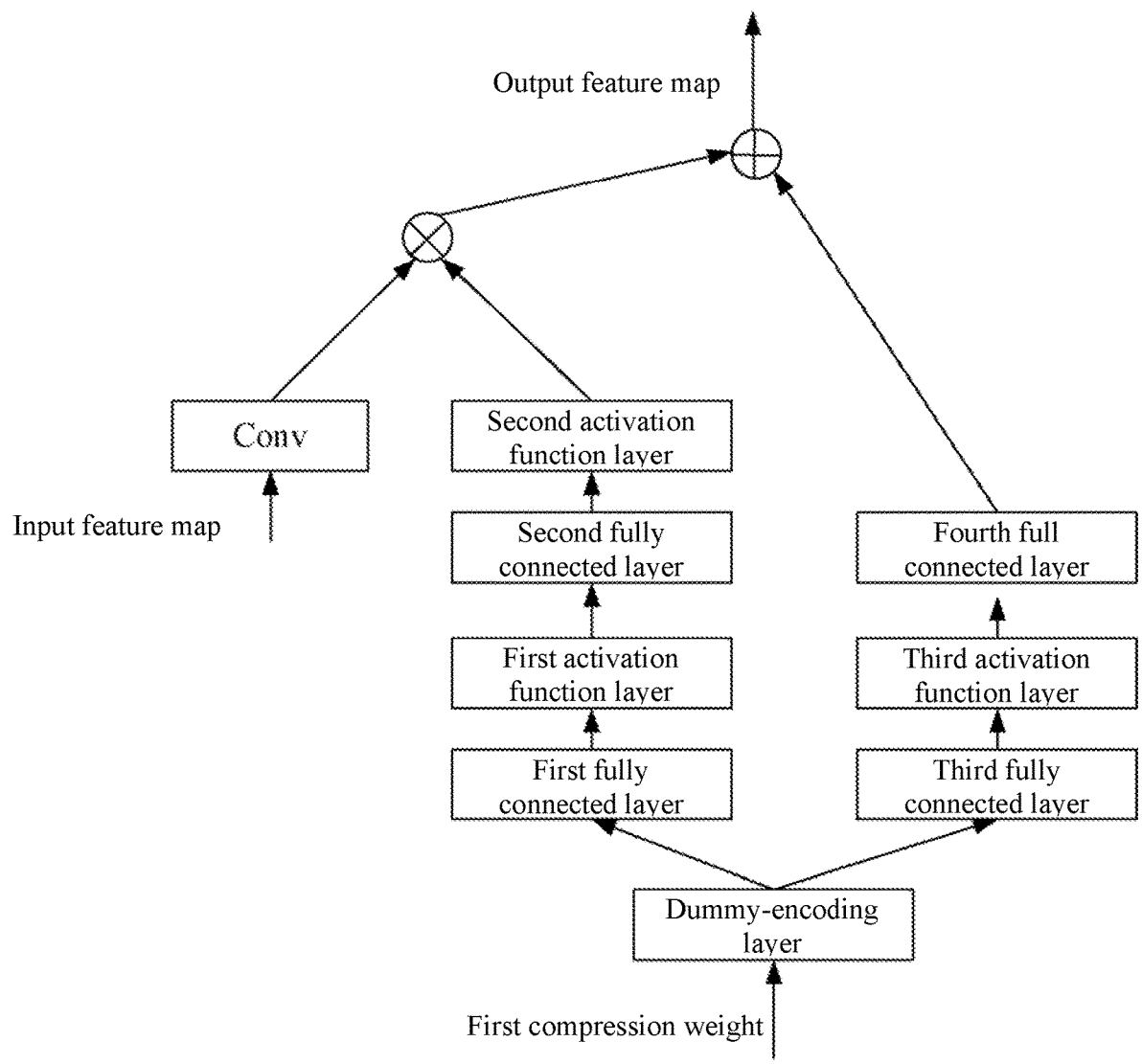
FIG. 3 is a schematic network architecture of an exemplary convolution layer according to some embodiments of the present disclosure.

FIG. 3 is a schematic network architecture of an exemplary convolution layer according to some embodiments of the present disclosure. In some embodiments, as shown in FIG. 3, the convolutional layer includes a dummy-encoding layer, a simple convolutional layer (e.g., Cony layer as shown in FIG. 3), a first conditional branch, a second conditional branch, and a calculation layer. An input of the dummy-encoding layer is the first compression weight, and an output of the dummy-encoding layer enters the first conditional branch and the second conditional branch, respectively. An input of the simple convolutional layer is the input feature map, and an output of the simple convolutional layer, an output of the first conditional branch and an output of the second conditional branch all enter the calculation layer, and the calculation layer outputs the output feature image.

In some embodiments, the simple convolutional layer includes a two-bit convolution kernel with the number of channels of input features being 1, and the number of channels of output features being j, where j is a positive integer and greater than one.

The first conditional branch includes a first fully connected layer, a first activation function layer, a second fully connected layer, and a second activation function layer in the order of calculation. That is, an input of the first fully connected layer is the output of the dummy-encoding layer, an input of the first activation function layer is an output of the first fully connected layer, an input of the second fully connected layer is an output of the first activation function layer, an input of the second activation function layer is an output of the second fully connected layer, and an output of the second activation function is the output of the first conditional branch.

The number of output channels of the first fully connected layer is different from the number of output channels of the second fully connected layer, and the number of output channels of the second fully connected layer is j (j is an integer greater than 1). The activation function is used to implement linear classification of features. In some embodiments, both the first activation function layer and the second activation function layer use exponential functions as activation functions.

The second branch includes a third fully connected layer, a third activation function layer, and a fourth fully connected layer in the order of calculation. That is, an input of the third fully connected layer is the output of the dummy-encoding layer, an input of the third activation function layer is an output of the third fully connected layer, an input of the fourth fully connected layer is an output of the third activation function layer, an input of the fourth fully connected layer is the output of the third activation function layer, and an output of the fourth fully connected layer is the output of the second conditional branch.

The number of output channels of the third fully connected layer is different from the number of output channels of the fourth fully connected layer, and the number of output channels of the fourth fully connected layer is j. The third activation function layer also uses an exponential function as an activation function.

Correspondingly, the image processing device performs the fully-connected operation and the exponential operation on the code value to obtain the first condition value and the second condition value, which includes the following processes.

The code value is inputted to the first condition branch. A first fully-connected operation, a first exponential operation, a second fully-connected operation, and a second exponential operation are sequentially performed on the code value to obtain the first condition value. The number of output channels of the first fully-connected operation and the number of output channels of the second fully-connected operation are different.

The code value is inputted into the second condition branch. A third fully-connected operation, a third exponential operation, and a fourth fully-connected operation are sequentially performed on the code value to obtain the second condition value. The number of output channels of the third fully-connected operation and the number of output channels of the fourth fully-connected operation are different, and the number of output channels of the second fully-connected operation and the number of output channels of the fourth fully-connected operation are the same.

In some embodiments, it is assumed that the number of output channels calculated by the first fully-connected operation is m, $u_m^T$ refers to a weight of the first fully-connected operation, $u_j^T$ refers to a weight of the second fully-connected operation. The first exponential operation can be expressed as: $s_m = \exp^{u_m^T DummyEn(\lambda)}$, wherein s m refers to a value of the first exponential operation, DummyEn ($\lambda$) refers to the code value corresponding to the first compression weight $\lambda$, and exp denotes the exponential function of the mathematical constant e, which is the exponential function of $u_m^T DummyEn(\lambda)$.

The second exponential operation can be expressed as:

$$s_j = \exp^{u_j^T s_m},$$

where $s_j$ refers to the first condition value.

Assuming that the number of output channels of the third fully-connected operation is the same as the number of output channels of the first fully-connected operation, both are m, $v_m^T$ refers to the number of output channels of the third fully-connected operation, $v_j^T$ refers to the number of output channels of the fourth fully-connected operation, the third exponential operation can be expressed as: $b_m = \exp^{v_m^T DummyEn(\lambda)}$, where b m refers to the code value of the third exponential operation.

The fourth fully-connected operation can be expressed as: $b_j = v_j^T b_m$, where $b_j$ refers to the second condition value.

In some embodiments, the image processing device performs the convolution process on the input feature map to obtain the feature information of the input feature map, which includes: multiplying the feature image $X_c$ ($_{c=1, 2, \ldots, i}$) of each of i feature channels of the input feature image X with a two-dimensional convolution kernel Wi,j of i input channels of the input feature and j output channels of the output feature to obtain the feature information corresponding to the feature map $X_c$. The feature information corresponding to the i feature maps is added to obtain the feature information corresponding to the input feature map.

In some embodiments, the image processing device obtains the output information of the convolutional layer according to the feature information, the first condition value, and the second condition value, which includes the following processes.

The image processing device inputs the feature information, the first condition value, and the second condition value to the calculation layer, and adds a product of the feature information and the first condition value to the second condition value to obtain the output information.

In some embodiments, the image processing device calculates the j output features by using the formula:

$$Y_j = s_j \sum_{c=1}^{i} X_c * W_{i,j} + b_j,$$

where $Y_j$ refers to the j-th output feature.

The j output features are combined to obtain an output feature map.

Method 2: combine the first quantization parameter in the first quantization network to achieve the control of the target code rate.

In some embodiments, the image processing device inputs the first feature map into the first quantization network to perform the quantization process to obtain the second feature map that is quantized, which includes the following processes.

The image processing device inputs the first feature map and the first quantization parameter into the first quantization network to perform a division and rounding process to obtain the second feature map that is quantized.

In some embodiments, the calculation formula for the quantization process can be: Y_q=round(Y/α), where Y_q refers to the second feature map, Y refers to the first feature map, a refers to the first quantization parameter, and round refers to a rounding process.

Correspondingly, when the first quantization parameter is used to quantize the first feature map in the first quantization network and the inverse quantization process is performed in the subsequent inverse quantization network, the first quantization parameter also needs to be used in the inverse quantization process.

That is, the image processing device inputs the third feature map into the inverse quantization network to perform the inverse quantization process to obtain the fourth feature map that is inversely quantized, which includes the following processes.

The image processing device inputs the third feature map and the first quantization parameter into the inverse quantization network and multiplies them to obtain the fourth feature map that is inversely quantized.

Method 3: combining the first compression weight with the first non-linear coding network and combining the first quantization parameter with the first quantization network to jointly achieve the control of the target code rate.

That is, Method 3 is a combination of Method 1 and Method 2. In Method 3, the image processing device inputs the target image into the first non-linear coding network to perform the non-linear coding process to obtain the first feature map, which includes the following processes.

The image processing device inputs the target image and the first compression weight into the first non-linear coding network. The first non-linear coding network performs the dummy-encoding process on the first compression weight example to obtain the code value corresponding to the first compression weight example, and uses the code value to perform the convolution process on the target image to obtain the first feature map of the target image.

The first feature map and the first quantization parameter are input into the first quantization network to perform the division and rounding process to obtain the second feature map that is quantized.

The second feature map is inputted to the first entropy coding network to perform the compression process to obtain the third feature map.

The third feature map and the first quantization parameter are inputted to the inverse quantization network and are multiplied to obtain the fourth feature map that is inversely quantized.

The fourth feature map is inputted into the first decoding processing network to perform the decoding process to obtain the compressed image.

The target image and the first compression weight are inputted to the first non-linear coding network. The first non-linear coding network performs the dummy-encoding process on the first compression weight example to obtain the code value corresponding to the first compression weight example, and uses the code value to perform the convolution process on the target image to obtain the first feature map of the target image. References can be made to the description in Method 1. The first feature map and the first quantization parameter are inputted into the first quantization network to perform the division and rounding process to obtain the second feature map that is quantized. References can be made to the description of Method 2 and detailed description thereof is omitted herein.

Figure 4:
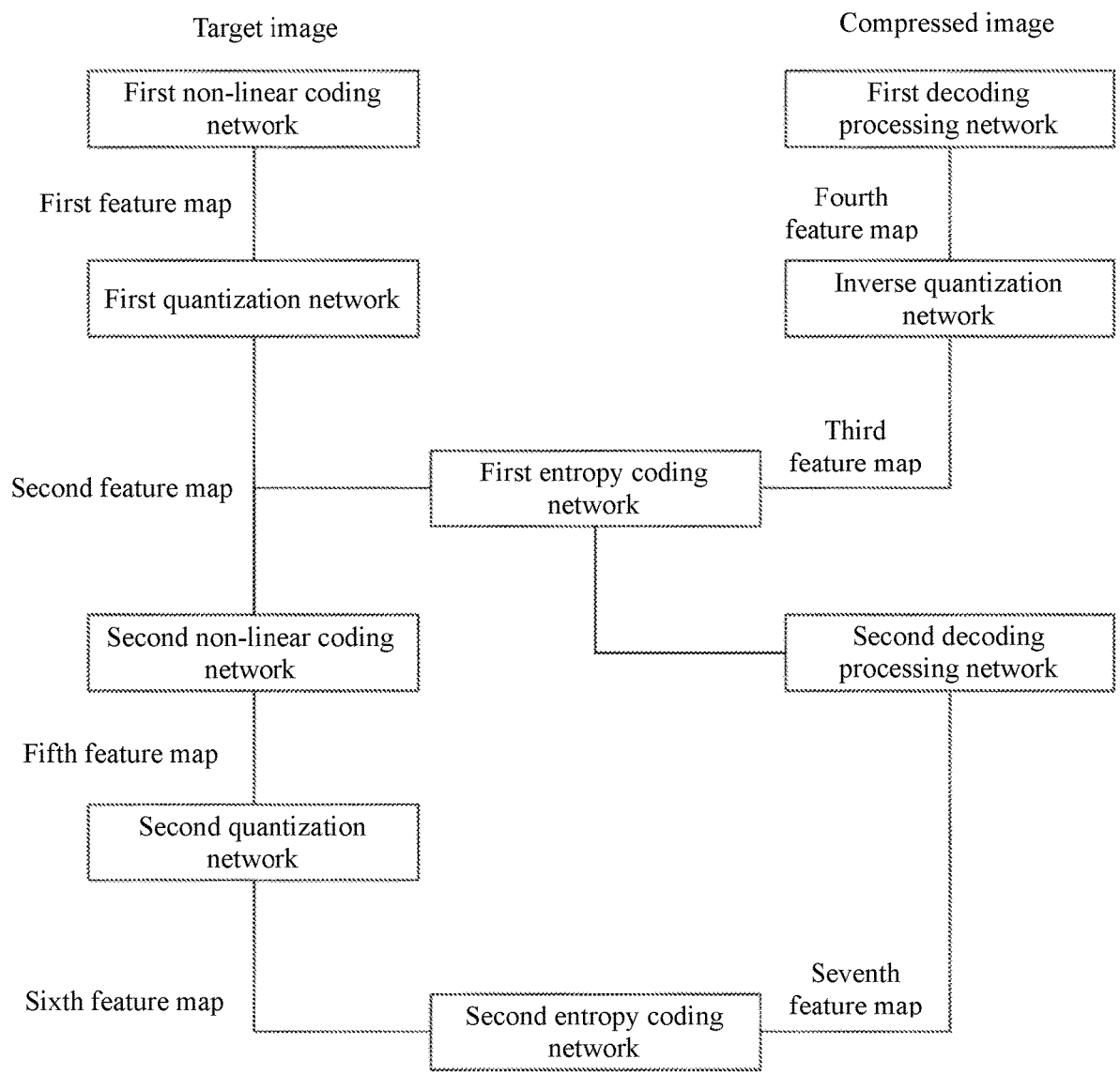
FIG. 4 is a schematic network architecture of another exemplary image compression model according to some embodiments of the present disclosure.

FIG. 4 is a schematic network architecture of another exemplary image compression model according to some embodiments of the present disclosure. As shown in FIG. 4, the image compression model provided by the present disclosure includes the first non-linear coding network, the compression network, and a compression parameter generation network. The compression network includes the first quantization network and the sub-compression network. The image processing device inputs the target image and the first code rate parameter into the image compression model that has been trained for processing to obtain the compressed image with the target code rate, which includes the following processes.

The image processing device inputs the target image into the first non-linear coding network to perform the non-linear coding process to obtain the first feature map.

The first feature map is inputted into the first quantization network to perform the quantization process to obtain the second feature map that is quantized.

The second feature map is inputted into the compression parameter generation network to perform a data processing process to obtain the compression parameter.

The compression parameter and the second feature map are inputted into the sub-compression network to perform the compression process to obtain the compressed image.

In some embodiments, the compression parameter generation network includes a second non-linear coding network and a sub-generation network. The image processing device inputs the second feature map into the compression parameter generation network to perform the data processing process to obtain the compression parameter, which includes the following processes.

The second feature map is inputted into the second non-linear coding network to perform the non-linear coding process to obtain a fifth feature map.

The fifth feature map is inputted into the sub-generation network to perform the data processing process to obtain the compression parameter.

In some embodiments, the sub-generation network includes a second quantization network, a second entropy coding network, and a second non-linear coding network. The image processing device inputs the fifth feature map into the sub-generation network to perform the data processing process to obtain the compression parameter, which includes the following processes.

The image processing device inputs the fifth feature map to the second quantization network to perform the rounding process to obtain a sixth feature map.

The sixth feature map is inputted to the second entropy coding network to perform the compression process to obtain a seventh feature map.

The seventh feature map is inputted to the second non-linear coding network to obtain the compression parameter.

The compression process of the second feature map by the second entropy coding network includes: performing the lossless compression process on the second feature map to obtain the binary file, and converting the binary file into the seventh feature map.

In some embodiments, the sub-compression network includes the first entropy coding network, the inverse quantization network, and the first decoding processing network. The image processing device inputs the second feature map and the compression parameter into the sub-compression network to perform the compression process to obtain the compressed image, which includes the following processes.

The image processing device inputs the second feature map and the compression parameter into the first entropy coding network to perform the compression process to obtain the third feature map.

The third feature map is inputted to the inverse quantization network to perform the inverse quantization process to obtain the fourth feature map that is inversely quantized.

The fourth feature map is inputted into the first decoding processing network to perform the decoding process to obtain the compressed image.

The compression process of the second feature map by the first entropy coding network includes: performing the lossless compression process on the second feature map using the compression parameter to obtain the binary file of the second feature map, and converting the binary file into the third feature map. The compression parameter refers to a compression coefficient between the second feature map and the third feature map. Different code rates of the third feature map correspond to different compression coefficients, thereby resulting in different code rates of the compressed image.

The second decoding network includes the non-linear decoding layer or the post-processing layer including the non-linear decoding layer. If the second decoding network includes the non-linear decoding layer, the compression parameter can be obtained after the second decoding network performs the non-linear decoding process on the seventh feature map. If the second decoding network includes the post-processing layer, the first decoding network performs the non-linear decoding process on the seventh feature map, and then performs the post-processing operation (for example, the activation function operation) to obtain the compression parameter.

For the image compression model shown in FIG. 4, the image processing device uses the first compression weight and/or the first quantization parameter to achieve the control of the target code rate in at least seven methods as follows.

Method A: combining the first compression weight in the first non-linear coding network to achieve the control of the target code rate.

Method A is the same as Method 1, that is, the image processing device inputs the target image into the first non-linear coding network to perform the non-linear coding process to obtain the first feature map, which includes the following processes.

The image processing device inputs the target image and the first compression weight into the first non-linear coding network. The first non-linear coding network performs the dummy-encoding process on the first compression weight example to obtain the code value corresponding to the first compression weight example, and uses the code value to perform the convolution process on the target image to obtain the first feature map of the target image.

For specific implementation, references can be made to the related description in Method 1, and detailed description thereof is omitted herein.

Method B: combining the first compression weight in the second non-linear coding network to adjust the compression parameters, thereby achieving the control of the target bit rate.

In some embodiments, the image processing device inputs the target image and the first code rate parameter into the image compression model that has been trained for processing to obtain the compressed image with the target code rate, which includes the following processes.

The image processing device inputs the target image into the first non-linear coding network to perform the non-linear coding process to obtain the first feature map of the target image.

The first feature map is inputted into the first quantization network to perform the quantization process to obtain the second feature map that is quantized.

The second feature map and the first compression weight are inputted into the second non-linear coding network. The second non-linear coding network performs the dummy-encoding process on the first compression weight example to obtain the code value corresponding to the first compression weight example, and uses the code value to perform the convolution process on the second feature map to obtain the fifth feature map of the second feature map.

The fifth feature map is inputted into the sub-generation network to perform the data processing process to obtain the compression parameter.

The compression parameter and the second feature map are inputted to the first entropy coding network to perform the compression process to obtain the third feature map.

The third feature map and the first quantization parameter are inputted to the inverse quantization network and are multiplied to obtain the fourth feature map that is inversely quantized.

The fourth feature map is inputted into the first decoding processing network to perform the decoding process to obtain the compressed image.

In the embodiments of the present disclosure, the image processing device inputs the second feature map and the first compression weight into the second non-linear coding network. The second non-linear coding network performs the dummy-encoding process on the first compression weight example to obtain the code value corresponding to the first compression weight example, and uses the code value to perform the convolution process on the second feature map to obtain the fifth feature map of the second feature map. Similar to Method 1, the image processing device inputs the target image and the first compression weight into the first non-linear coding network. The first non-linear coding network performs the dummy-encoding process on the first compression weight example to obtain the code value corresponding to the first compression weight example, and uses the code value to perform the convolution process on the target image to obtain the first feature map of the target image.

That is, the second non-linear coding network includes the K convolutional layers, and K is an integer greater than or equal to 1. The input information of each of the K convolutional layers includes the input feature image and the first compression weight. The output feature image of the preceding convolutional layer is the input feature image of the succeeding convolutional layer. The input feature image of the first convolutional layer is the second feature map, and the output feature image of the K-th convolutional layer is the fifth feature map.

For example, the processing of the input information by each of the K convolutional layers includes: performing the dummy-encoding process on the first compression weight example to obtain the code value corresponding to the first compression weight example, performing the fully-connected operation and the exponential operation on the code value to obtain the first condition value and the second condition value, performing the convolution process on the input feature image to obtain the feature information of the input feature image, and obtaining the output feature image of the convolutional layer according to the feature Information, the first condition value, and the second condition value.

For specific implementation, references can be made to the description of Method 1 and the detailed description thereof is omitted herein.

It should be understood that different first compression weights correspond to different compression parameters. When the first entropy coding network uses different compression parameters to compress the second feature map, the third feature maps with different code rates may be obtained, thereby obtaining the compressed images with different code rates.

Method C: combining the first compression weight in the first non-linear coding network, and combining the first compression weight in the second non-linear coding network to achieve the control of the target code rate.

Mothed C is a combination of Method A and Method B. In Method C, the image processing device inputs the target image and the first code rate parameter into the image compression model that has been trained for processing to obtain the compressed image with the target code rate, which includes the following processes.

The image processing device inputs the target image and the first compression weight into the first non-linear coding network. The first non-linear coding network performs the dummy-encoding process on the first compression weight example to obtain the code value corresponding to the first compression weight example, and uses the code value to perform the convolution process on the target image to obtain the first feature map of the target image.

The first feature map is inputted into the first quantization network to perform the quantization process to obtain the second feature map that is quantized.

The second feature map and the first compression weight are inputted into the second non-linear coding network. The second non-linear coding network performs the dummy-encoding process on the first compression weight example to obtain the code value corresponding to the first compression weight example, and uses the code value to perform the convolution process on the second feature map to obtain the fifth feature map of the second feature map.

The fifth feature map is inputted into the sub-generation network to perform the data processing process to obtain the compression parameter.

The compression parameter and the second feature map are inputted to the first entropy coding network to perform the compression process to obtain the third feature map.

The third feature map and the first quantization parameter are inputted to the inverse quantization network and are multiplied to obtain the fourth feature map that is inversely quantized.

The fourth feature map is inputted into the first decoding processing network to perform the decoding processing process to obtain the compressed image.

The image processing device inputs the target image and the first compression weight into the first non-linear coding network. The first non-linear coding network performs the dummy-encoding process on the first compression weight example to obtain the code value corresponding to the first compression weight example, and uses the code value to perform the convolution process on the target image to obtain the first feature map of the target image. For specific implementation, references can be made to the description of Method A. Similarly, the image processing device inputs the second feature map and the first compression weight into the second non-linear coding network. The second non-linear coding network performs the dummy-encoding process on the first compression weight example to obtain the code value corresponding to the first compression weight example, and uses the code value to perform the convolution process on the second feature map to obtain the fifth feature map of the second feature map. For specific implementation, references can be made to the related description of Method B and the detailed description thereof is omitted herein.

Method D: combining the first quantization parameter in the first quantization network to achieve the control of the target code rate.

Method D is the same as Method 2, that is, the image processing device inputs the first feature map into the first quantization network to perform the quantization process to obtain the second feature map that is quantized, which includes the following processes.

The image processing device inputs the first feature map and the first quantization parameter into the first quantization network to perform the division and rounding process to obtain the second feature map that is quantized.

For specific implementation, references can be made to the related description of Method 2 and the detailed description thereof is omitted herein.

Correspondingly, when the first quantization parameter is used to quantize the first feature map in the first quantization network, and the inverse quantization process is performed in the subsequent inverse quantization network, the first quantization parameter also needs to be used to perform the inverse quantization process.

That is, the image processing device inputs the third feature map into the inverse quantization network to perform the inverse quantization process to obtain the fourth feature map that is inversely quantized, which includes the following processes.

The image processing device inputs the third feature map and the first quantization parameter into the inverse quantization network and multiplies them to obtain the fourth feature map that is inversely quantized.

Method E: combining the first compression weight in the first non-linear coding network, and combining the first quantization parameter in the first quantization network to achieve the control of the target code rate.

Method E is similar to Method 3, except that Method E adds the compression parameter generation network. That is, the image processing device inputs the target image and the first code rate parameter into the image compression model that has been trained for processing to obtain the compressed image with the target code rate, which includes the following processes.

The image processing device inputs the target image and the first compression weight into the first non-linear coding network. The first non-linear coding network performs the dummy-encoding process on the first compression weight example to obtain the code value corresponding to the first compression weight example, and uses the code value to perform the convolution process on the target image to obtain the first feature map of the target image.

The first feature map and the first quantization parameter are inputted into the first quantization network to perform the division and rounding process to obtain the second feature map that is quantized.

The second feature map is inputted into the compression parameter generation network to perform the data processing process to obtain the compression parameter.

The compression parameter and the second feature map are inputted to the first entropy coding network to perform the compression process to obtain the third feature map.

The third feature map and the first quantization parameter are inputted to the inverse quantization network and are multiplied to obtain the fourth feature map that is inversely quantized.

The fourth feature map is inputted into the first decoding processing network to perform the decoding processing process to obtain the compressed image.

The image processing device inputs the target image and the first compression weight into the first non-linear coding network. The first non-linear coding network performs the dummy-encoding process on the first compression weight example to obtain the code value corresponding to the first compression weight example, and uses the code value to perform the convolution process on the target image to obtain the first feature map of the target image. The first feature map and the first quantization parameter are inputted into the first quantization network to perform the division and rounding process to obtain the second feature map that is quantized. For specific implementation, references can be made to the related description of Method 3 and detailed description thereof is omitted herein.

Method F: combine the first quantization parameter in the first quantization network, and combining the first compression weight in the second non-linear network to achieve the control of the target code rate.

Method F is a combination of Method B and Method D. That is, the image processing device inputs the target image and the first code rate parameter into the image compression model that has been trained for processing to obtain the compressed image with the target code rate, which includes the following processes.

The image processing device inputs the target image into the first non-linear coding network to perform the non-linear coding process to obtain the first feature map of the target image.

The first feature map and the first quantization parameter are inputted into the first quantization network to perform the division and rounding process to obtain the second feature map that is quantized.

The second feature map input and the first compression weight to the second non-linear coding network. The second non-linear coding network performs the dummy-encoding process on the first compression weight example to obtain the code value corresponding to the first compression weight example, and uses the code value to perform the convolution process on the second feature map to obtain the fifth feature map.

The fifth feature map is inputted into the sub-generation network to perform the compression process to obtain the compression parameter.

The compression parameter and the second feature map are inputted to the first entropy coding network to perform the compression process to obtain the third feature map.

The third feature map and the first quantization parameter are inputted to the inverse quantization network and are multiplied to obtain the fourth feature map that is inversely quantized.

The fourth feature map is inputted into the first decoding processing network to perform the decoding processing process to obtain the compressed image.

The first feature map and the first quantization parameter are inputted into the first quantization network to perform the division and rounding process. For specific implementation of the process of obtaining the second feature map that is quantized, references can be made to the related description of Method D. The second feature map and the first compression weight are inputted to the second non-linear coding network. The second non-linear coding network performs the dummy-encoding process on the first compression weight example to obtain the code value corresponding to the first compression weight example, and uses the code value to perform the convolution process on the second feature map to obtain the fifth feature map. For specific implementation, references can be made to the related description of Method B and detailed description thereof is omitted herein.

Method G, combining the first compression weight in the first non-linear coding network, combining the first quantization parameter in the first quantization network, and combining the first compression weight in the second non-linear network to jointly achieve the control of the target code rate.

Mode G is a combination of Method A, Method B, and Method D. That is, the image processing device inputs the target image and the first code rate parameter into the image compression model that has been trained for processing to obtain the compressed image with the target code rate, which includes the following processes.

The image processing device inputs the target image and the first compression weight to the first non-linear coding network. The first non-linear coding network performs the dummy-encoding process on the first compression weight example to obtain the code value corresponding to the first compression weight example, and uses the code value to perform the convolution process on the target image to obtain the first feature image.

The first feature map and the first quantization parameter are inputted into the first quantization network to perform the division and rounding process to obtain the second feature map that is quantized.

The second feature map and the first compression weight are inputted to the second non-linear coding network. The second non-linear coding network performs the dummy-encoding process on the first compression weight example to obtain the code value corresponding to the first compression weight example, and uses the code value to perform the convolution process on the second feature map to obtain the fifth feature map.

The fifth feature map is inputted into the sub-generation network to perform the compression process to obtain the compression parameter.

The compression parameter and the second feature map are inputted to the first entropy coding network to perform the compression process to obtain the third feature map.

The third feature map and the first quantization parameter are inputted to the inverse quantization network and are multiplied to obtain the fourth feature map that is inversely quantized.

The fourth feature map is inputted into the first decoding processing network to perform the decoding processing process to obtain the compressed image.

The image processing device inputs the target image and the first compression weight to the first non-linear coding network. The first non-linear coding network performs the dummy-encoding process on the first compression weight example to obtain the code value corresponding to the first compression weight example, and uses the code value to perform the convolution process on the target image to obtain the first feature image. For specific implementation of obtaining the first feature image, references can be made to the related description of Method A. The first feature map and the first quantization parameter are inputted into the first quantization network to perform the division and rounding process to obtain the second feature map that is quantized. For specific implementation of obtaining the second feature map, references can be made to the related description of Method D. The second feature map and the first compression weight are inputted to the second non-linear coding network. The second non-linear coding network performs the dummy-encoding process on the first compression weight example to obtain the code value corresponding to the first compression weight example, and uses the code value to perform the convolution process on the second feature map to obtain the fifth feature map. For specific implementation, references can be made to the related description of Method B.

Two network architectures in combination of ten methods are described above for obtaining the compressed image with the target code rate according to the first code rate parameter. It should be understood that in the above ten methods, any of the compression weight, the compression parameter determined by the compression weight, and the quantization coefficient can affect the code rate of the compressed image. In the present disclosure, through predetermining the relationship between the code rate parameter and the code rate, when the target image is compressed using the first code rate parameter corresponding to the target code rate, the compressed image with the target code rate can be obtained.

Figure 5:
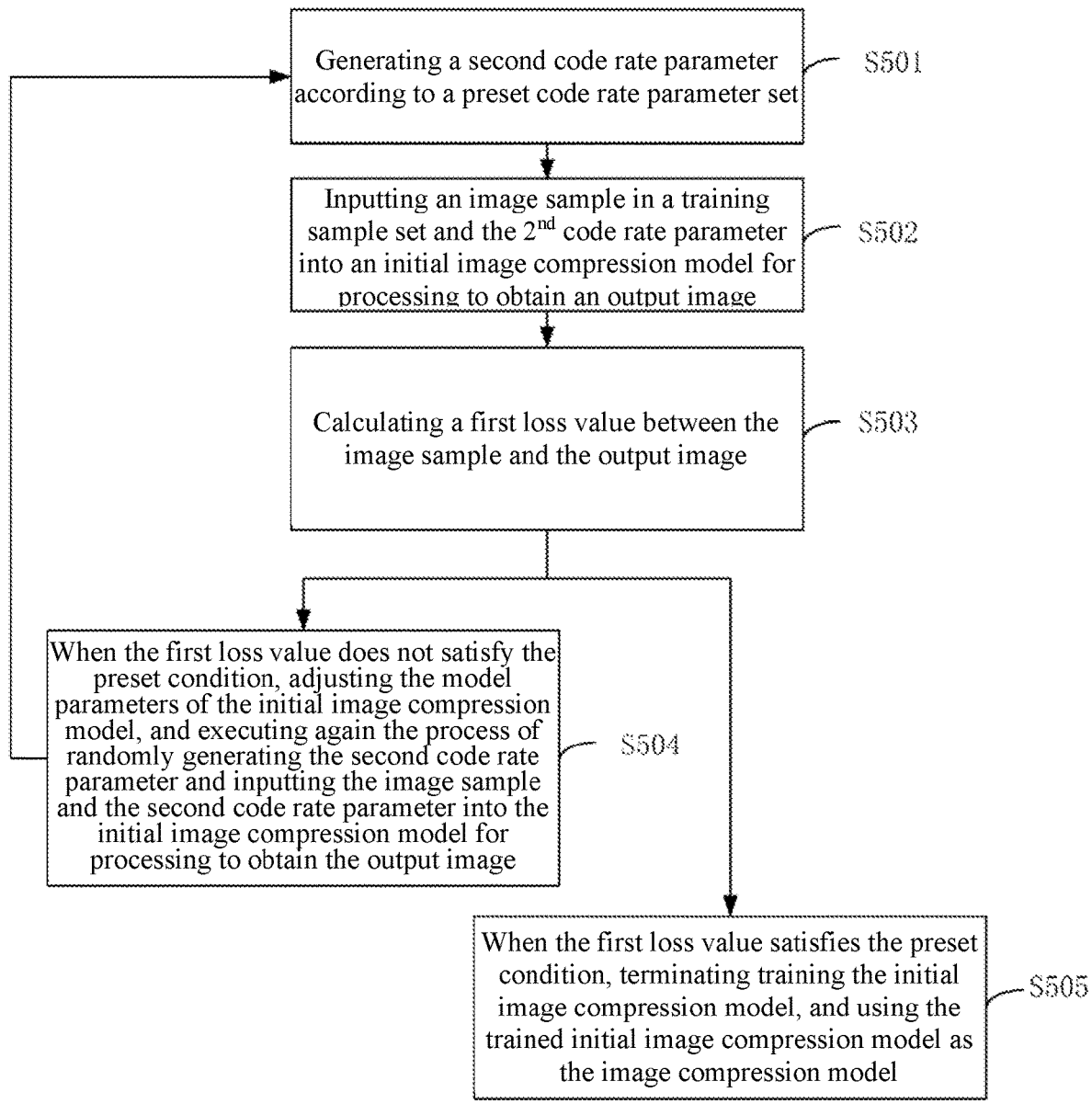
FIG. 5 is a flowchart of another exemplary image compression method according to some embodiments of the present disclosure.

FIG. 5 is a flowchart of another exemplary image compression method according to some embodiments of the present disclosure. As shown in FIG. 5, the image compression method includes the process of obtaining the image compression model before performing the image compression process shown in FIG. 1. The method includes the following processes.

At S501: a second code rate parameter is generated according to a preset code rate parameter set.

It is assumed that a training device (which may be an image processing device or other devices) is preset with the code rate parameter set, including the compression weight and/or the quantization parameter. Each code rate parameter represents a corresponding code rate. Before training an image sample each time, the training device randomly selects the second code rate parameter for training according to the code rate parameter set, or selects sequentially according to the sequence of each code rate parameter in the code rate parameter set.

At S502: an image sample in a training sample set and the second code rate parameter are inputted into an initial image compression model for processing to obtain an output image.

It should be understood that a network structure corresponding to the initial image compression model during a training process is the same as a network structure corresponding to an application process (compressed image). For example, the network structure can be as shown in FIG. 2 or FIG. 4.

Correspondingly, the process of inputting the image sample and the second code rate parameter in the training sample set into the initial image compression model for processing to obtain the output image is the same as the process of inputting the target image and the first code rate parameter at S102, which is the process of processing in the image compression model that has been trained for processing to obtain the compressed image with the target code rate. For details, references can be made to the previously-described ten methods, and description thereof is omitted herein.

At S503: a first loss value between the image sample and the output image is calculated.

In some embodiments, the training device calculates a second loss value between the image sample and the output image according to a preset first loss function.

The first loss function may be an L1 norm loss function, a mean-square error (MSE) loss function, a multi-scale structural similarity (MS-SSIM) loss function, or a combination thereof.

The preset first loss function is used to calculate a loss value of the entropy coding network. The first loss function may be a logarithmic function. When the initial image compression model is the network structure shown in FIG. 2, the loss value of the coding network includes a loss value of the first entropy coding network, that is, the preset first loss function is used to calculate the loss value between the second feature map and the third feature map. When the initial image compression model is the network structure shown in FIG. 4, the loss value of the coding network includes the loss value of the first entropy coding network and a loss value of the second entropy coding network, that is, the preset first loss function is used to calculate the loss value between the second feature map and the third feature map, and the loss value between the fifth feature map and the sixth feature map.

The first loss value is calculated according to the second loss value, the loss value of the entropy coding network, and the compression weight used when obtaining the output image in the initial image compression model.

If the second code rate parameter includes the compression weight, the compression weight used when obtaining the output image in the initial image compression model is the compression weight in the second code rate parameter. If the second code rate parameter does not include the compression weight, the compression weight used when obtaining the output image in the initial image compression model is a fixed compression weight.

In some embodiments, the training device multiplies the compression weight used when obtaining the output image in the initial image compression model by the second loss value, and adds to the loss value of the entropy coding network to obtain the second loss value.

For example, $lose_m$ refers to the first loss value, $\lambda$ refers to the compression weight, $lose_1$ refers to the loss value of the first entropy coding network, and $lose_2$ refers to the loss value of the second entropy coding network. When the initial image compression model is the network structure shown in FIG. 2, the second loss value lose can be expressed as: $lose=\lambda*lose_m+lose_1$. When the initial image compression model is the network structure shown in FIG. 3, the second loss value lose can be expressed as: $lose=\lambda*lose_m+lose_1+lose_2$.

After the first loss value between the image sample and the output image is obtained, it is determined whether the first loss value satisfies a preset condition. When the first loss value does not satisfy the preset condition, S504 is executed. When the first loss value satisfies the preset condition, S505 is executed.

The preset condition is that an error between the first loss value obtained currently and the first loss value obtained from previous trainings is less than or equal to a preset threshold, that is, it is determined whether the change of the first loss value tends to be smooth.

At S504: when the first loss value does not satisfy the preset condition, the model parameters of the initial image compression model are adjusted, and the process of randomly generating the second code rate parameter and inputting the image sample and the second code rate parameter into the initial image compression model for processing to obtain the output image is executed again.

For example, when the training device confirms that the error between the first loss value obtained currently and the first loss value obtained during previous training sessions is greater than the preset threshold, it is determined that an accuracy of the current initial image compression model does not satisfy the requirement. At this time, it is necessary to adjust the model parameters of the initial image compression model, to return to S501 to execute the processes from S501 through S503 until the error between the first loss value determined in S503 and the first loss value obtained in the previous training process is less than or equal to the preset threshold.

At S505: when the first loss value satisfies the preset condition, training the initial image compression model is terminated, and the trained initial image compression model is used as the image compression model.

When the training device confirms that the difference between the first loss value obtained currently and the first loss value obtained in the previous training process is less than or equal to the preset threshold, it is determined that the training of the current initial image compression model satisfies the expected requirements, the training of the initial image compression model is terminated.

At this time, the initial image compression model after adjusting the model parameters has been trained with a large number of samples, and the loss value thereof remains in a small range. The initial image compression model can be used to compress the image to obtain the more accurately compressed image. Thus, the initial image compression model when training is terminated (that is, after the last training is completed) can be determined as the image compression model.

It should be understood that the sequence number of each step in the foregoing embodiments does not refer to the order of execution, and the order of execution of each process is determined by the function and internal logic thereof, and should not constitute any limitation to the implementation process of the embodiments of the present disclosure.

Figure 6:
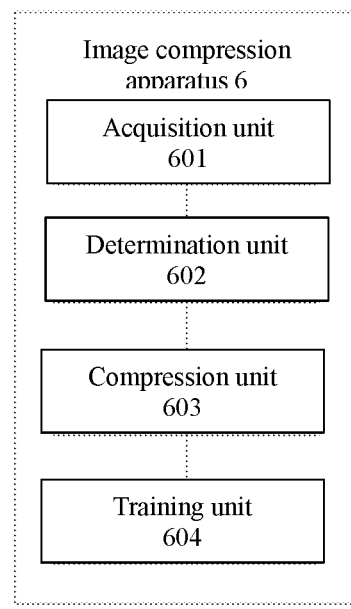
FIG. 6 is a schematic structural diagram of an exemplary image compression apparatus according to some embodiments of the present disclosure.

FIG. 6 is a schematic structural diagram of an exemplary image compression apparatus according to some embodiments of the present disclosure. As shown in FIG. 6, the image compression device includes circuits used to execute the processes in the embodiments corresponding to FIG. 1 and FIG. 5. For details, references can be made to the related description of the respective embodiments of FIG. 1 and FIG. 5. For ease of description, only the parts related to this embodiment are shown. As shown in FIG. 6, the image compression device 6 includes an acquisition circuit 601 configured to obtain the target image and the target code rate corresponding to the target image, a determination circuit 602 configured to determine the first code rate parameter corresponding to the target code rate, and a compression circuit 603 configured to input the target image and the first code rate parameter into the trained image compression model for processing to obtain the compressed image with the target code rate. The image compression model is obtained based on the training of multiple code rate parameters including the first code rate parameter.

In some embodiments, the image compression device 6 further includes a training circuit 604. Before inputting the target image and the first bit rate parameter into the image compression circuit 603 for processing to obtain the compressed image with the target code rate, the training circuit 604 is configured to generate the second code rate parameter according to the preset code rate parameter set; input the image sample in the training sample set and the second code rate parameter into the initial image compression model for processing to obtain the output image, where the training sample set includes a plurality of image samples; calculating the first loss value between the image sample and the output image; when the first loss value does not satisfy the preset condition, adjust the model parameters of the initial image compression model, and return to execute the process of randomly generating the second code rate parameter and inputting the image sample and the second code rate parameter into the initial image compression model for processing to obtain the output image; and when the first loss value satisfies the preset condition, terminate the training of the initial image compression model, and use the trained initial image compression model as the image compression model.

Figure 7:
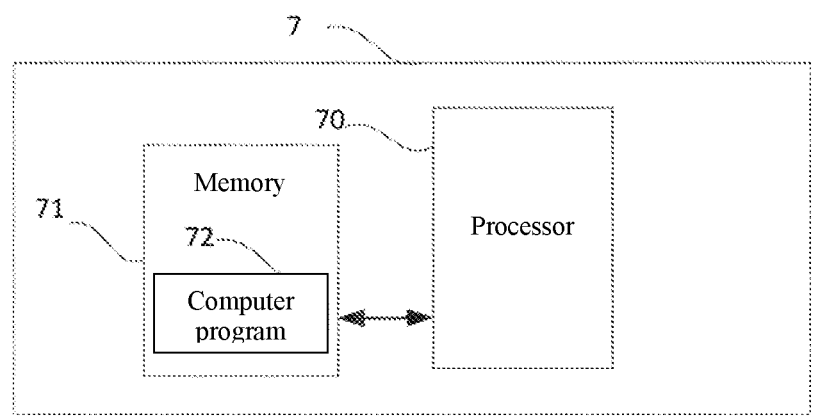
FIG. 7 is a schematic structural diagram of an exemplary image compression device according to some embodiments of the present disclosure.

FIG. 7 is a schematic structural diagram of an exemplary image compression device according to some embodiments of the present disclosure. As shown in FIG. 7, the image processing device 7 includes a processor 70, a memory 71, and a computer program 72 stored in the memory 71 and running on the processor 70, such as a voice recognition program. When the processor 70 executes the computer program 72, the processes in the foregoing image compression method embodiments, such as steps S101 through S103 shown in FIG. 1, are implemented. In some embodiments, when the processor 70 executes the computer program 72, the functions of the modules/units in the foregoing device embodiments, for example, the functions of the circuit 601-604 shown in FIG. 6 are implemented.

In some embodiments, the computer program 72 is divided into one or more modules/units, and the one or more modules/units are stored in the memory 71 and executed by the processor 70 to implement the embodiments of the present disclosure. The one or more modules/units may be a series of computer program instruction segments capable of completing specific functions, and the instruction segments are used to describe the execution process of the computer program 72 in the image processing device 7. For example, the computer program 72 is divided into an acquisition unit, a conversion unit, and an identification unit. For specific functions of each unit, references can be made to the related description of the corresponding embodiments shown in FIG. 5, and description thereof is omitted herein.

The image processing device 7 may be a computing device such as a desktop computer, a notebook, a palmtop computer, and a cloud server. The image processing device may include, but is not limited to, a processor 70 and a memory 71. Those skilled in the art can understand that FIG. 7 is only an example of the voice recognition device 7, and does not constitute a limitation on the image processing device 7. It may include more or less components than shown in the figure, or combine certain components, or include different components. For example, the image processing device may also include input and output devices, network access devices, buses, and so on.

The processor 70 may be a central processing unit (CPU), other general-purpose processors, digital signal processors (DSP), application specific integrated circuits (ASIC), field-programmable gate array (FPGA) or other programmable logic devices, discrete gates or transistor logic devices, discrete hardware components, etc. The general-purpose processor may be a microprocessor or any conventional processor.

The memory 71 may be an internal storage unit of the image processing device 7, for example, a hard disk or a memory of the image processing device 7. The memory 71 may also be an external storage device of the image processing device 7, such as a plug-in hard disk equipped on the image processing device 7, a smart media card (SMC), and a secure digital (SD) card, a flash card, etc. Further, the memory 71 may also include both an internal storage unit and an external storage device of the image processing device 7. The memory 71 is used to store the computer program and other programs and data required by the image processing device. The memory 71 can also be used to temporarily store data that has been outputted or will be outputted.

The present disclosure also provides a computer-readable storage medium. The computer-readable storage medium stores the computer program. When the computer program is executed by a processor, the foregoing image compression method can be implemented.

The present disclosure provides a computer program product. When the computer program product runs on an image processing device, the image processing device can implement the foregoing image compression method.

Those skilled in the art can clearly understand that for the convenience and conciseness of description, only the division of the above functional units and modules is used as an example. In practical applications, the above functions can be allocated to and completed by different functional units and modules as required. That is, the internal structure of the device is divided into different functional units or modules to complete all or part of the functions described above. The functional units and modules in the embodiments can be integrated into one processing unit, or each unit can exist alone physically, or two or more units can be integrated into one unit. The above-mentioned integrated units can be implemented by hardware or software or a combination thereof. In addition, the specific names of the functional units and modules are only for the convenience of distinguishing each other, and are not used to limit the scope of the present disclosure. For the specific working process of the units and modules in the foregoing system, reference may be made to the corresponding process in the foregoing method embodiments, and description thereof is omitted herein.

In the above-mentioned embodiments, the description of each embodiment has its own focus. For parts that are not described in detail or included in one embodiment, references can be made to the related descriptions of other embodiments.

Those of ordinary skill in the art may realize that the units and algorithm steps of the examples described in combination with the embodiments disclosed herein can be implemented by electronic hardware or a combination of computer software and electronic hardware. Whether these functions are executed by hardware or software depends on the specific application and design constraint conditions of the technical solution. Professionals and technicians can use different methods for each specific application to implement the described functions, but such implementation should not be considered beyond the scope of the present disclosure.

The above-mentioned embodiments are only used to illustrate the technical solutions of the present disclosure, not to limit them. Although the present disclosure has been described in detail with reference to the foregoing embodiments, those of ordinary skill in the art should understand that the foregoing technical solutions described in the embodiments can be modified, or some of the technical features can be equivalently replaced. These modifications or replacements do not cause the essence of the corresponding technical solutions to deviate from the spirit and scope of the technical solutions of the embodiments of the present disclosure, and should be included in the scope of the present disclosure.

What is claimed is:

1. An image compression method, comprising:
    obtaining a target image and a target code rate corresponding to the target image;
    determining a first code rate parameter corresponding to the target code rate; and
    inputting the target image and the first code rate parameter into an image compression model, that has been trained, for processing to obtain a compressed image with the target code rate, wherein the image compression model is obtained by training an initial image compression model based on multiple code rate parameters including the first code rate parameter;
    wherein:
        the first code rate parameter includes a first compression weight;
        the image compression model includes a first non-linear coding network and a compression network; and
        inputting the target image and the first code rate parameter into the image compression model that has been trained for processing to obtain the compressed image with the target code rate includes:
            inputting the target image and the first compression weight into the first non-linear coding network to perform a dummy-encoding process on a first compression weight example to obtain a code value corresponding to the first compression weight example via the first non-linear coding network, and using the code value to perform a convolution process on the target image to obtain a first feature map of the target image; and
            inputting the first feature map to the compression network to perform a compression process to obtain the compressed image.

2. The image compression method according to claim 1, wherein:
    the first non-linear coding network includes K convolutional layers, K being an integer greater than or equal to 1;
    input information of each of the K convolutional layers includes an input feature image and the first compression weight, an output feature image of a preceding convolutional layer is the input feature image of a succeeding convolutional layer, the input feature image of the first convolutional layer is the target image, and the output feature image of the K-th convolutional layer is the first feature map; and
    a processing of the input information by each of the K convolutional layers includes:
        performing the dummy-encoding process on the first compression weight example to obtain the code value corresponding to the first compression weight example;
        performing a fully-connected operation and an exponential operation on the code value to obtain a first condition value and a second condition value;
        performing the convolution process on the input feature image to obtain feature information of the input feature image; and
        obtaining the output feature image of the corresponding convolutional layer according to the feature information, the first condition value, and the second condition value.

3. The image compression method according to claim 2, wherein performing the fully-connected operation and the exponential operation on the code value to obtain the first condition value and the second condition value includes:
    sequentially performing a first fully-connected operation, a first exponential operation, a second fully-connected operation, and a second exponential operation on the code value to obtain the first condition value, the number of output channels of the first fully-connected operation and the number of output channels of the second fully-connected operation being different; and
    sequentially performing a third fully-connected operation, a third exponential operation, and a fourth fully-connected operation on the code value to obtain the second condition value, the number of output channels of the third fully-connected operation and the number of output channels of the fourth fully-connected operation being different, and the number of output channels of the second fully-connected operation and the number of output channels of the fourth fully-connected operation being the same.

4. The image compression method according to claim 2, wherein obtaining the output feature image of the convolutional layer according to the feature information, the first condition value, and the second condition value includes:
adding a product of the feature information and the first condition value to the second condition value to obtain the output feature image.

5. The image compression method according to claim 1, wherein:
the first code rate parameter includes a first quantization parameter;
the image compression model includes a first non-linear coding network and a compression network, and the compression network includes a first quantization network and a sub-compression network; and
inputting the target image and the first code rate parameter into the image compression model that has been trained for processing to obtain the compressed image with the target code rate includes:
inputting the target image into the first non-linear coding network to perform a non-linear coding process to obtain a first feature map;
inputting the first feature map and the first quantization parameter to the first quantization network to obtain a second feature map that is quantized; and
inputting the second feature map to the sub-compression network to perform a compression process to obtain the compressed image.

6. The image compression method according to claim 5, wherein:
the sub-compression network includes a first entropy coding network, an inverse quantization network, and a first decoding processing network; and
inputting the second feature map to the sub-compression network to perform the compression process to obtain the compressed image includes:
inputting the second feature map into the first entropy coding network to perform the compression process to obtain a third feature map;
inputting the third feature map and the first quantization parameter into the inverse quantization network to perform a multiplication process to obtain a fourth feature map that is inversely quantized; and
inputting the fourth feature map into the first decoding processing network to perform a decoding process to obtain the compressed image.

7. The image compression method according to claim 1, wherein:
the first code rate parameter includes a first compression weight;
the image compression model includes a first non-linear coding network, a compression network, and a compression parameter generation network;
the compression network includes a first quantization network and a sub-compression network; and
inputting the target image and the first code rate parameter into the image compression model that has been trained for processing to obtain the compressed image with the target code rate includes:
inputting the target image into the first non-linear coding network to perform a non-linear coding process to obtain a first feature map;
inputting the first feature map into the first quantization network perform a quantization process to obtain a second feature map that is quantized; and
inputting the second feature map and the first compression weight into the compression parameter generation network to perform a data processing process to obtain a compression parameter; and
inputting the compression parameter and the second feature map into the sub-compression network to perform a compression process to obtain the compressed image.

8. The image compression method according to claim 7, wherein:
the compression parameter generation network includes a second non-linear coding network and a sub-generation network; and
inputting the second feature map and the first compression weight into the compression parameter generation network to perform the data processing process to obtain the compression parameter includes:
inputting the second feature map and the first quantization parameter into the second non-linear coding network to perform a dummy-encoding process on a first quantization parameter example to obtain a code value corresponding to the first quantization parameter example, and using the code value to perform the convolution process on the second feature map to obtain a fifth feature map; and
inputting the fifth feature map into the sub-generation network to perform the data processing process to obtain the compression parameter.

9. The image compression method according to claim 8, wherein:
the first non-linear coding network includes K convolutional layers, K being an integer greater than or equal to 1;
input information of each of the K convolutional layers includes an input feature image and the first compression weight, an output feature image of a preceding convolutional layer is the input feature image of a succeeding convolutional layer, the input feature image of the first convolutional layer is the second feature map, and the output feature image of the K-th convolutional layer is the fifth feature map; and
processing of the input information by each of the K convolutional layers includes:
performing the dummy-encoding process on the first compression weight example to obtain the code value corresponding to the first compression weight example;
performing a fully-connected operation and an exponential operation on the code value to obtain a first condition value and a second condition value;
performing the convolution process on the input feature image to obtain feature information of the input feature image; and
obtaining the output feature image of the corresponding convolutional layer according to the feature information, the first condition value, and the second condition value.

10. The image compression method according to claim 9, wherein performing the fully-connected operation and the exponential operation on the code value to obtain the first condition value and the second condition value includes:
sequentially performing a first fully-connected operation, a first exponential operation, a second fully-connected operation, and a second exponential operation on the code value to obtain the first condition value, the number of output channels of the first fully-connected operation and the number of output channels of the second fully-connected operation being different; and
sequentially performing a third fully-connected operation, a third exponential operation, and a fourth fully-connected operation on the code value to obtain the second condition value, the number of output channels of the third fully-connected operation and the number of output channels of the fourth fully-connected operation being different, and the number of output channels of the second fully-connected operation and the number of output channels of the fourth fully-connected operation being the same.

11. The image compression method according to claim 9, wherein obtaining the output feature image of the corresponding convolutional layer according to the feature information, the first condition value, and the second condition value includes:
adding a product of the feature information and the first condition value to the second condition value to obtain the output feature image.

12. The image compression method according to claim 8, wherein:
the sub-generation network includes a second quantization network, a second entropy coding network, and a second decoding processing network; and
inputting the fifth feature map into the sub-generation network to perform the data processing process to obtain the compression parameter includes:
inputting the fifth feature map into the second quantization network to perform a rounding process to obtain a sixth feature map;
inputting the sixth feature map into the second entropy coding network to perform the compression process to obtain a seventh feature map; and
inputting the seventh feature map into the second decoding processing network to perform a decoding process to obtain the compression parameter.

13. The image compression method according to claim 1, before inputting the target image and the first code rate parameter into the image compression model that has been trained for processing to obtain the compressed image with the target code rate, further comprising:
randomly generating a second code rate parameter according to a preset code rate parameter set;
inputting an image sample in a training sample set and the second code rate parameter into an initial image compression model for processing to obtain an output image, the training sample set including a plurality of image samples;
calculating a first loss value between the image sample and the output image;
in response to the first loss value not satisfying a preset condition, adjusting model parameters of the initial image compression model, and returning to execute the process of randomly generating the second code rate parameter and inputting the image sample and the second code rate parameter into the initial image compression model for processing to obtain the output image; and
in response to the first loss value satisfying the preset condition, terminating training of the initial image compression model, and using the initial image compression model that has been trained as the image compression model.

14. The image compression method according to claim 13, wherein calculating the first loss value between the image sample and the output image includes:
calculating a second loss value between the image sample and the output image;
calculating a loss value of the entropy coding network; and
calculating the first loss value according to the second loss value, the loss value of the entropy coding network, and the compression weight used when obtaining the output image in the initial image compression model.

15. The image compression method according to claim 14, wherein calculating the first loss value according to the second loss value, the loss value of the entropy coding network, and the compression weight used when obtaining the output image in the initial image compression model includes:
multiplying the compression weight used when obtaining the output image in the initial image compression model by the second loss value, and adding to the loss value of the entropy coding network to obtain the second loss value.

16. An image compression device, comprising:
a memory;
a processor; and
a computer program stored in the memory and executed by the processor to:
obtain a target image and a target code rate corresponding to the target image;
determine a first code rate parameter corresponding to the target code rate; and
input the target image and the first code rate parameter into an image compression model that has been trained for processing to obtain a compressed image with the target code rate, wherein the image compression model is obtained by training an initial image compression model based on multiple code rate parameters including the first code rate parameter;
wherein:
the first code rate parameter includes a first compression weight;
the image compression model includes a first non-linear coding network and a compression network; and
inputting the target image and the first code rate parameter into the image compression model that has been trained for processing to obtain the compressed image with the target code rate includes:
inputting the target image and the first compression weight into the first non-linear coding network to perform a dummy-encoding process on a first compression weight example to obtain a code value corresponding to the first compression weight example via the first non-linear coding network, and using the code value to perform a convolution process on the target image to obtain a first feature map of the target image; and
inputting the first feature map to the compression network to perform a compression process to obtain the compressed image.

17. The image compression device according to claim 16, wherein:
the first non-linear coding network includes K convolutional layers, K being an integer greater than or equal to 1;

input information of each of the K convolutional layers includes an input feature image and the first compression weight, an output feature image of a preceding convolutional layer is the input feature image of a succeeding convolutional layer, the input feature image of the first convolutional layer is the target image, and the output feature image of the K-th convolutional layer is the first feature map; and a processing of the input information by each of the K convolutional layers includes:
  performing the dummy-encoding process on the first compression weight example to obtain the code value corresponding to the first compression weight example;
  performing a fully-connected operation and an exponential operation on the code value to obtain a first condition value and a second condition value;
  performing the convolution process on the input feature image to obtain feature information of the input feature image; and
  obtaining the output feature image of the corresponding convolutional layer according to the feature information, the first condition value, and the second condition value.

18. The image compression device according to claim 17, wherein when performing the fully-connected operation and the exponential operation on the code value to obtain the first condition value and the second condition value, the processor is further configured to:
  sequentially perform a first fully-connected operation, a first exponential operation, a second fully-connected operation, and a second exponential operation on the code value to obtain the first condition value, the number of output channels of the first fully-connected operation and the number of output channels of the second fully-connected operation being different; and
  sequentially perform a third fully-connected operation, a third exponential operation, and a fourth fully-connected operation on the code value to obtain the second condition value, the number of output channels of the third fully-connected operation and the number of output channels of the fourth fully-connected operation being different, and the number of output channels of the second fully-connected operation and the number of output channels of the fourth fully-connected operation being the same.

* * * * *